United States Patent [19]

Boyd

[11] 4,175,310

[45] Nov. 27, 1979

[54] SNAP RING TOOL

[76] Inventor: William R. Boyd, 3757 Rosewood Ave., Los Angeles, Calif. 90066

[21] Appl. No.: 812,998

[22] Filed: Jul. 5, 1977

[51] Int. Cl.$^{2}$ .............. B23P 19/04

[52] U.S. Cl. .............. 29/229

[58] Field of Search .............. 29/229; 81/90 C

[56] References Cited

U.S. PATENT DOCUMENTS

| | | | |
|---|---|---|---|
| 672,791 | 4/1901 | Mills | 81/90 C |
| 1,300,275 | 4/1919 | Johnson | 81/90 C |
| 2,441,846 | 5/1948 | Schaaff et al. | 29/229 |
| 2,518,142 | 8/1950 | Huntington | 29/229 |
| 3,145,463 | 8/1964 | Hockett | 29/229 |

FOREIGN PATENT DOCUMENTS

| | | | |
|---|---|---|---|
| 267761 | 4/1950 | Switzerland | 29/229 |
| 804483 | 11/1958 | United Kingdom | 29/229 |

*Primary Examiner*—James L. Jones, Jr.
*Attorney, Agent, or Firm*—James W. McFarland

[57] ABSTRACT

A tool for facilitating removal or insertion of spring type snap rings mounted in either an internal or external groove on a member includes a relatively small end section insertable into hard-to-reach locations such as deeply into an internal bore. An elongated pin extending outwardly from the end section is inserted within an eyelet of the snap ring. The tool is rotated about its longitudinal axis with the end section reacting against the member carrying the snap ring. Due to the offset relation of the pin to this axis, the pin is displaced radially to force the end of the snap ring out of its groove to facilitate removal of the snap ring.

11 Claims, 15 Drawing Figures

SNAP RING TOOL

BACKGROUND OF THE INVENTION

This invention relates to tools for facilitating removal of spring type, circular, non-closed retaining rings conventionally mounted in either an internal or external groove of a member.

Snap rings of the class referred to have numerous applications in various machinery acting many times as shaft retainers. Often the snap ring is located in positions where it is extremely difficult or awkward to insert a tool within the end eyelets of the snap ring. Assembly and disassembly of the snap ring is conventionally accomplished by radially displacing the end eyelets to expand or contract the snap ring against its natural spring action.

In many instances snap ring pliers which are normally utilized for working with such snap rings cannot readily be inserted within the snap ring eyelets. Other types of tools designed for snap rings are shown in U.S. Pat. Nos. 2,669,772; 2,835,028; 2,900,107; 3,050,838; 3,075,284, and German Pat. No. 948,378. None of these prior art arrangements however contemplate the novel construction of the present invention which allows the tool to react against the member carrying the snap ring so that an elongated pin can pry the snap ring from its groove by simple rotation of the tool.

SUMMARY OF THE INVENTION

It is an important object of the present invention to provide a snap ring tool which has an end section rotatable against the member carrying the snap ring so that an elongated pin carried by the tool and insertable within the snap ring causes radial displacement of the snap ring because of the non-equidistant location of the pin from various points about the periphery of the end section.

Another important object of the present invention is to provide a snap ring tool highly useful in hard-to-reach locations, especially where there is little working space at the snap ring.

More particularly, an important object is to provide a snap ring tool having a circular end section rotatable against the member carrying the snap ring and about the major axis of the tool. An elongated pin insertable in the snap ring extends from the end section in offset relation to the major axis so that rotation of the tool causes the pin to pry the snap ring radially from the groove in which it is carried.

Another important object is to provide a snap ring tool of the type referred to which is equally useful with both internally and externally mounted snap rings.

Another object is to provide such a snap ring tool wherein the tip pin is removably secured to the end section to allow use of variously configured pins with the tool.

A further object is to provide such a snap ring tool configured with a pair of tip pins insertable in both eyelets of a snap ring to increase leverage for radially displacing the snap ring.

These and other objects and advantages of the present invention are specifically set forth in or will become apparent from the following detailed description of preferred arrangements of the present invention when read in conjunction with the accompanying drawings.

BRIEF DESCRIPTION OF THE DRAWINGS

FIGS. **13*a* and 13*b* are plan cross-sectional views taken along lines 13—13 of FIG. 12 and showing the snap ring tool in two different operating positions.

DETAILED DESCRIPTION OF THE PREFERRED EMBODIMENT

Figure 1:
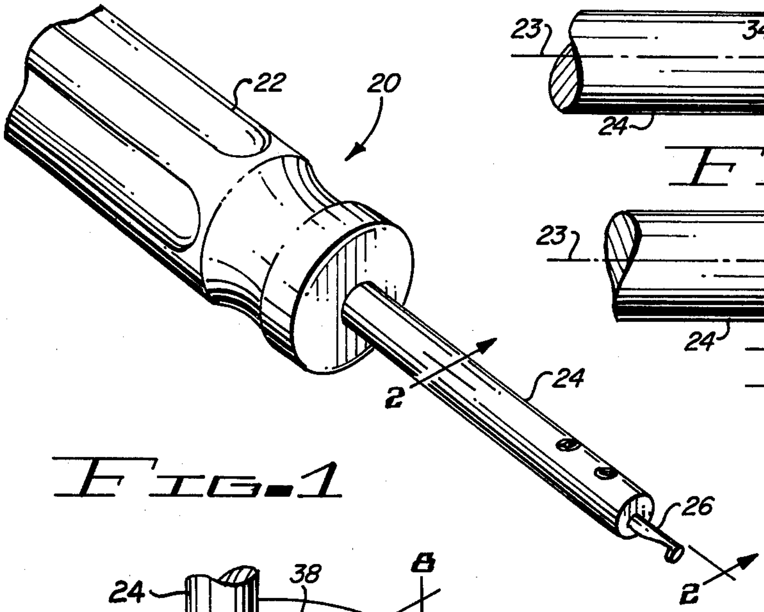
FIG. 1 is a partial perspective view of a snap ring tool as contemplated by the present invention.
Figure 2:
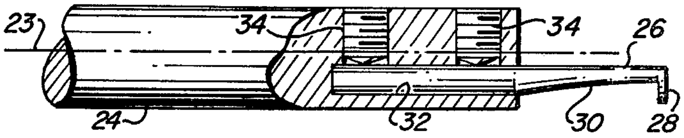
FIG. 2 is an elevational view taken along lines 2—2 of FIG. 1 with portions shown in cross sections.

Referring now more particularly to the drawings, a snap ring tool generally denoted by the numeral 20 includes handle means 22 at one end thereof, and an elongated element or shank 24 of circular cross section extending longitudinally therefrom in concentric relation to the major longitudinal axis 23 of the tool. Mounted to and extending outwardly from the end section of shank 24 is a smaller diameter tip pin 26 of elongated configuration and having a transversely turned end stretch 28. With transverse stretch 28 and a tapering section 30, the tip pin 26 is configured for insertion within an end eyelet of a snap ring type retaining member. As illustrated in FIG. 2, pin 26 is removably secured to the end section of shank 24 by being slidably received within a bore 32 in the end section. A pair of transversely extending set screws 34 are threadably received within the shank 24 to secure tip pin 26 thereto. It is important to note that the tip pin 26 is mounted to and extends from the end section of shank 24 in offset relationship to the major longitudinal axis 23. Preferably pin 26 is located inside the circular periphery of shank 24.

Figure 3:
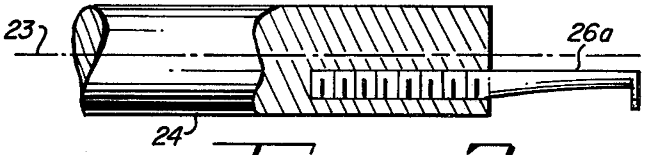
FIG. 3 is a view similar to FIG. 2 but showing a different arrangement for removably securing the tip pin to the tool.

FIG. 3 illustrates a modified arrangement for removably securing a tip pin **26*a* to the end section of shank element 24. Tip pin 26*a* is threadably received in its associated bore in the shank 24**.

Figure 4:
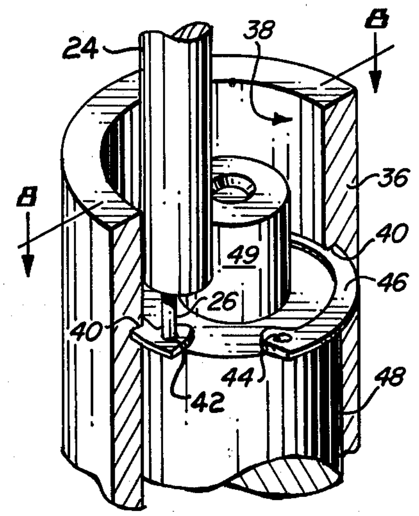
FIG. 4 is a partial perspective illustration of a snap ring tool as contemplated by the present invention being utilized for removal of an internally mounted snap ring.
Figure 5:
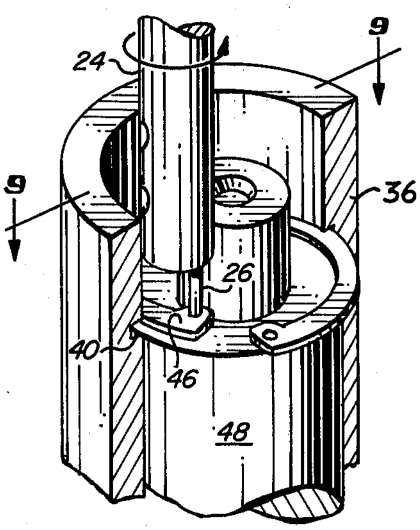
FIG. 5 is a view similar to FIG. 4 but showing the snap ring tool in a different position.

FIGS. 4 and 5 illustrate one typical use for such a snap ring tool. A circular member 36 has an internal bore defining an internal circular surface 38 therein which has a groove 40 for receiving a conventional snap ring type retaining member 46. Snap ring 46 is of circular, non-closed configuration having a pair of eyelets 42, 44 at its ends. Conventionally the spring action of the snap ring 46 holds the latter rigidly within groove 40 thus retaining a shaft or similar member 48 within the outer member 38.

Figure 8:
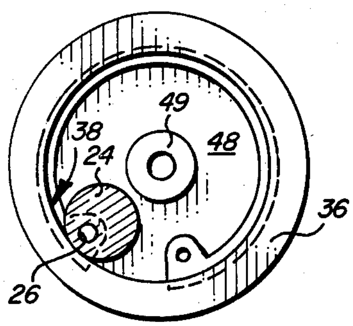
FIGS. 8–11 are plan cross-sectional views respectively taken along lines 8—8, 9—9, 10—10 and 11—11 of FIGS. 4–7.
Figure 9:
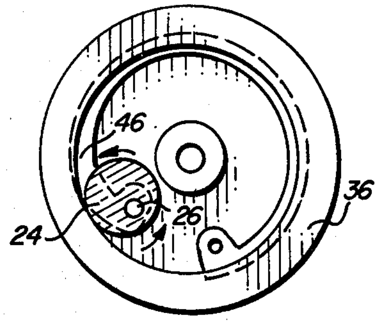

The relatively small size of shank 24 permits the latter to be easily inserted past an upstanding boss 49 and between the element 36 and 48 with the outer circular periphery of the end section of shank 24 in engagement with inner surface 38. Upon rotation of the snap ring tool about the major longitudinal axis of shank 24, the tip pin 26, which has been inserted within eyelet 42 of snap ring 46, is displaced radially inwardly because of its offset relation to the rotational axis. The reaction force of the natural spring action of the snap ring 46 is transmitted through shank 24 to element 36 during such rotation of the tool, thus causing the tip pin 26 and the end of the snap ring 46 to be shifted radially inwardly and pry the snap ring out of groove 40 as shown in FIG. 5. The radial movement of tip pin 26 and the attendant prying displacement of the snap ring from its groove is also clearly illustrated in FIGS. 8 and 9.

Figure 6:
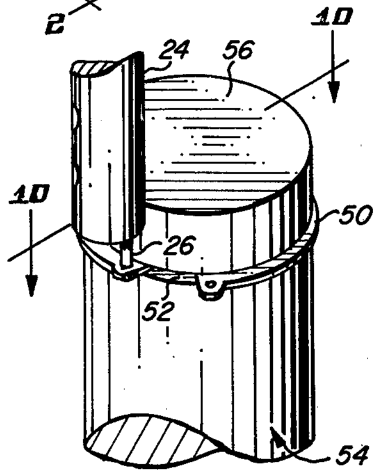
FIGS. 6 and 7 are views similar to FIGS. 4 and 5 but showing the tool when utilized for removing an externally mounted snap ring.
Figure 7:
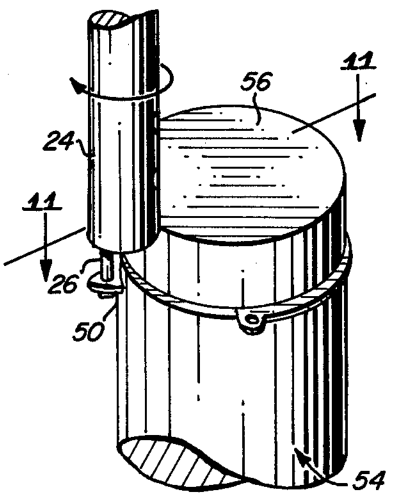

FIGS. 6 and 7 illustrate the snap ring tool being utilized to remove a snap ring 50 mounted within an external circular groove 52 disposed on the outer circular surface 54 of a member 56. Again, the tip pin 26 is inserted through one of the end eyelets of the snap ring 50 with the outer circular surface of the end section of shank 24 in rolling engagement with outer surface 54. As shown in FIGS. 6, 7, 10 and 11, rotation of the snap ring tool and subsequent rolling of the end section of shank 24 upon the member 56 displaces the end of the snap ring radially outwardly of the groove 52 in which it is carried to thus facilitate removal of the snap ring therefrom.

Figure 12:
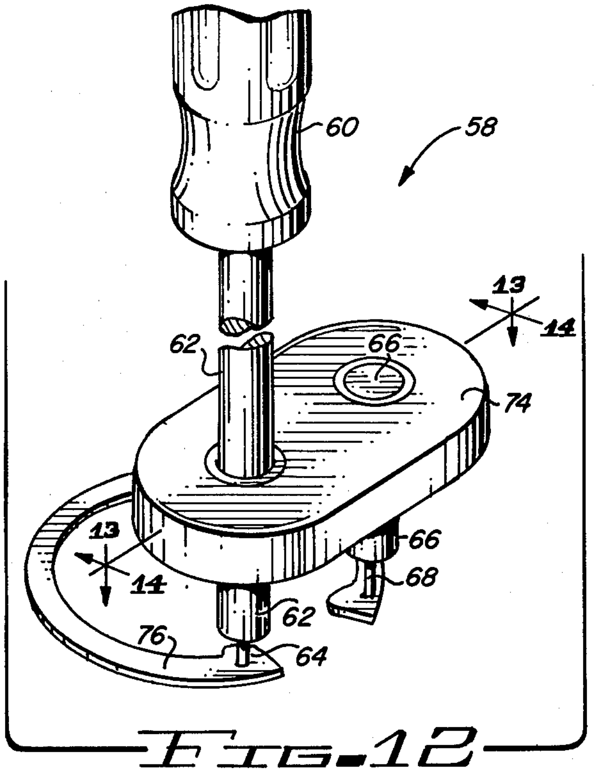
FIG. 12 is a partial perspective illustration of another form of the present invention.
Figure 13A:
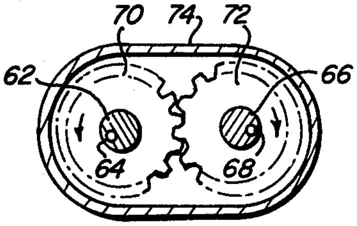
Figure 13B:
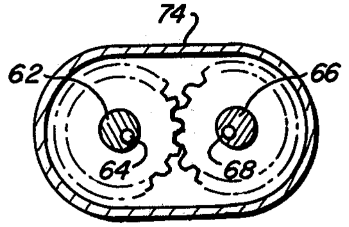
Figure 10:
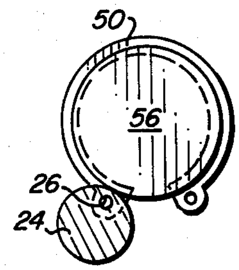
Figure 11:
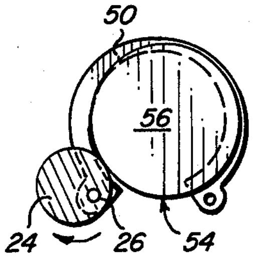
Figure 14:
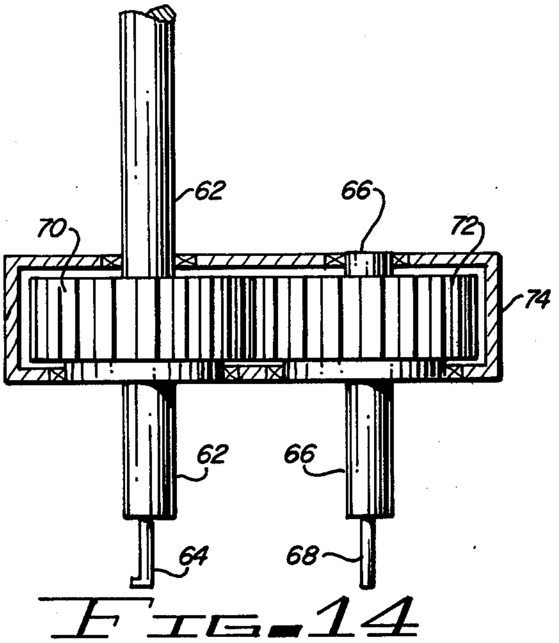
FIG. 14 is an elevational cross-sectional view taken along lines 14—14 of FIG. 12**.

A modified form of the invention is illustrated in FIGS. 12–14. Again the snap ring tool generally denoted by the numeral 58 includes handle means 60 at one end, a circular element or shank 62 extending outwardly from the handle means, and an end tip pin section 64 depending downwardly from the end of the shank 62 in offset relationship to the major rotational axis of shank 62. Further, the embodiment of FIGS. 12–14 includes a second elongated, circular element or shank 66, and a second tip pin 68 depending outwardly from the end section of shank 66 in offset relationship to the major rotational axis of the second shank 66. Also included are drive means in the form of a pair of intermeshing gears 70, 72 respectively rigidly mounted to the pair of shanks 64, 66. As necessary a housing 74 surrounding and enclosing the pair of gears 70, 72 may also be included.

In the arrangement of FIGS. 12–14, the pair of tip pins 64, 68 are relatively located and configured for insertion within both of the end eyelets of a single snap ring 76. As illustrated in FIGS. 13*a*, 13*b*, rotation of the handle 60 drives the tip pin 64 to displace the one end of snap ring 76 radially from the groove in which it is mounted. Through the gears 70, 72 the other tip pin 68 is driven to rotate in an opposite direction to shift the other end of the snap ring radially from ghe groove in which it is carried. Both shanks 62, 66 react against the member carrying the snap ring to produce the prying action. It will be apparent that the relatively small size of both shanks 62, 66 allows them to be inserted within a snap ring carried in an inside groove such as illustrated in FIGS. 4 and 5. Also, the snap ring tool of FIGS. 12–14 may have equal utility in assembling or disassembling a snap ring mounted on an external groove as illustrated in FIGS. 6 and 7. By engaging both ends of the snap ring 76, the snap ring tool of FIG. 12 thus affords greater leverage in prying the snap ring from its groove.

From the foregoing it will therefore be apparent that the present invention provides a tool of extremely simple construction which facilitates assembly or disassembly of a snap ring from its groove whether it be an internal or externally mounted snap ring. While in the preferred forms the end section of the shank of the snap ring tool is of circular configuration, it will be apparent that various other configurations for the shank may also be utilized. Regardless of the configuration of the shank 24, the present invention contemplates a tip pin which extends outwardly from the end of the shank and is disposed non-equidistantly from various points about the periphery of the end section that reacts against the member carrying the snap ring, so that rotation of the tool shifts the snap ring radially from its groove.

While preferred forms of the invention have been specifically illustrated and discussed, the foregoing detailed description should be considered exemplary in nature and not as limiting to the scope and the spirit of the invention as set forth in the appended claims.

Having described the invention with sufficient clarity that those skilled in the art may make and use it, I claim:

1. A tool for snap rings of the type having an eyelet opening and mounted in a groove of a member, comprising:

- an elongated element rotatable about its major longitudinal axis, said element having a circular periphery at one end concentric to said major axis for rolling engagement against the member;
- an elongated pin mounted to said one end of the element and extending longitudinally therefrom in offset relation to said major axis, said pin configured for insertion within the eyelet opening of a snap ring with the circular periphery of said element in rolling engagement against the member whereby rolling rotation of said element causes radial displacement of said pin to pry the snap ring from the groove;
- a second elongated element of circular configuration for rolling engagement against the member, said second element extending parallel to said first mentioned element;
- drive means for rotating said second element oppositely to rotation of said first element; and
- a second elongated pin mounted to and extending from said second element in offset relation to the rotational axis of said second element, said second pin configured for insertion within another eyelet opening of the snap ring with the second element in rolling engagement with the member, whereby rolling rotation of said first and second element causes radial displacement of the associated pins to pry the snap ring from the groove.

2. A tool as set forth in claim 1, wherein said drive means includes a pair of intermeshing gears mounted to said first and second elements.

3. In combination with a circular member having a circular surface and a groove therein, and a spring type retaining ring of circular, non-closed configuration having eyelet openings in the ends thereof and mounted within said groove; a tool for facilitating removal of said retaining ring, comprising:

- an elongated element having handle means at one end spaced from said member, said element rotatable about its major longitudinal axis, said element having an opposite end of generally circular configuration rollingly engageable with said member; and
- a pin extending longitudinally from said opposite end of the element in parallel, offset relation to said major axis, said pin insertable within an eyelet opening in one end of the retaining ring whereby upon rotation of said element about said major axis with said opposite end in rolling engagement with said member, said pin shifts radially to force said one end of the retaining ring out of said groove, said pin being located inside said circular periphery of said one end of the element.

4. A combination as set forth in claim 3, wherein said pin is removably secured to said one end of the element.

5. A combination as set forth in claim 4, wherein said pin is threadably mounted to said one end.

6. A combination as set forth in claim 4, wherein said pin is slidably received in a bore in said one end, and including set screw means transversely, threadably mounted in said one end engageable with said pin.

7. A combination as set forth in claim 3, wherein said pin includes a transverse stretch at its outer end for interengagement with the retaining ring.

8. A combination as set forth in claim 3, further including a second elongated element having an end of circular configuration rollingly engageable with said member, a second pin extending from said second element and configured and arranged to be inserted in the eyelet opening of the other end of said retaining ring, and drive means for rotating said second element in rolling engagement with the member and oppositely to rotation of said first mentioned element to cause radial shifting of said second pin to force the other end of the retaining ring out of said groove.

9. A combination as set forth in claim 8, wherein said drive means includes a pair of intermeshing gears mounted to said first and second elements.

10. A combination as set forth in claim 3, wherein said member has an outer circular surface and said groove is in said outer surface of the member, said one end of the element positionable to rotate against said outer surface.

11. A combination as set forth in claim 3, wherein said member has an inner circular surface and said groove is in said inner surface, said one end of the element positionable to rotate against said inner surface.

* * * * *